O. COE.
HARROW.
No. 19,489.  Patented Mar. 2, 1858.
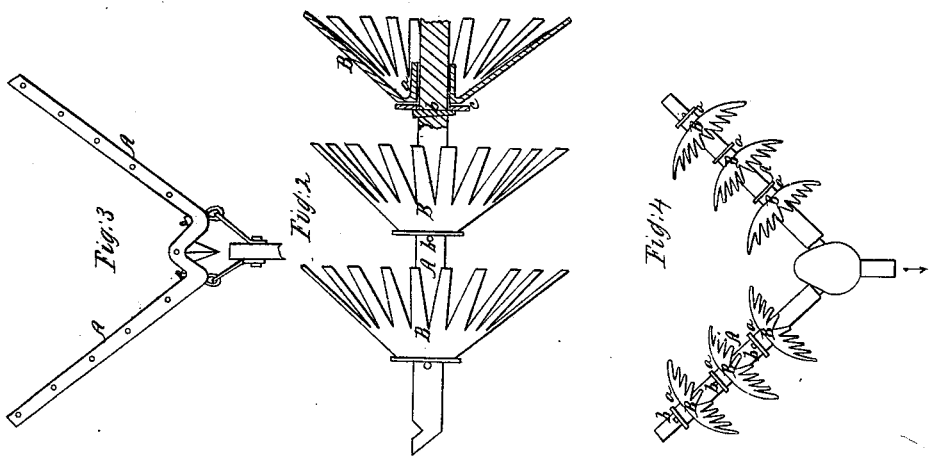
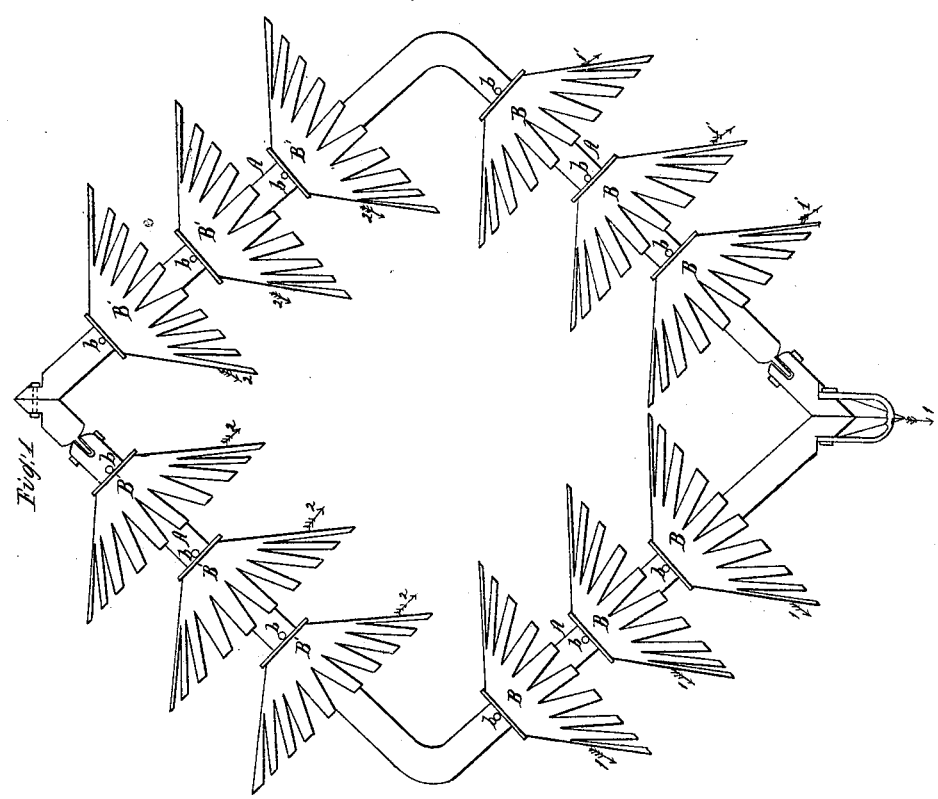

UNITED STATES PATENT OFFICE.

ORMAN COE, OF PORT WASHINGTON, WISCONSIN.

IMPROVEMENT IN HARROWS.

Specification forming part of Letters Patent No. 19,489, dated March 2, 1858.

*To all whom it may concern:*

Be it known that I, ORMAN COE, of Port Washington, in the county of Ozaukee and State of Wisconsin, have invented a new and useful Improvement in Harrows; and I do hereby declare that the following is a full, clear, and exact description of the same, reference being had to the accompanying drawings, forming part of this specification, in which—

Figure 1 a plan of a harrow constructed with my improvement. Fig. 2 is a detached view, showing two of the teeth in elevation and one in section. Figs. 3 and 4 are plans of different forms of frame to which my improvement may be applied without departing from the invention claimed by me.

Similar letters of reference in each of the several figures indicate corresponding parts.

The nature of my invention consists in the combination, with the bars of a harrow-frame, of a series of revolving circular concave forked harrow-teeth, said teeth being arranged in the peculiar manner shown, and serving most effectually for breaking up or pulverizing and preparing the soil in a condition suitable for receiving the seed, and also for covering in seed.

To enable others skilled in the art to make and use my invention, I will proceed to describe its construction and operation.

A A A A in the accompanying drawings represent the harrow-frame. Its bars are round and stand diagonal to the direction in which the harrow is drawn. This frame may be hinged or flexible to any extent desired or necessary.

B B B B' B' B' represent the harrow-teeth. They resemble in form hollow truncated cones or circular concaves made forked round their flaring edges, as shown in the drawings. Each of these teeth is furnished with a short tubular bearing, $a$, round the axis of its small diameter, as shown in Fig. 2, so that it may fit firm and revolve evenly on the round bars of the harrow-frame. The teeth thus constructed are slipped over the round bars and arranged on the harrow-frame in the relation to each other, so as to revolve freely, (shown in Figs. 1 and 2,) being prevented from crowding upon each other while in operation by means of stop-pins $b\ b$, which pass through and project out from the periphery of the bars, said pins being saved from wear by means of a friction-washer, $c$, interposed between the teeth and themselves, as shown in Fig. 2.

I have described a frame with four bars, A A, and believe that this form will answer best. Still, however, I do not confine myself to the same, as I may under certain circumstances arrange the teeth to advantage on frames similar to those illustrated by Figs. 3 and 4.

The operation of a harrow constructed as above described is as follows: The harrow being drawn in the direction of the arrow 1, its teeth B are caused, owing to their oblique position to the line of draft, to revolve in the direction of the arrows 1' 1' 1', while those B' revolve in the direction of the arrows 2 2 2. The harrow-teeth B B B, in revolving in the direction stated, cut with their forked edge into the soil and pulverize it, and then, owing to being concave, lift, carry it, and throw it toward the center of the harrow. The soil thus operated upon is again cut into by the teeth B', pulverized to a still finer degree, lifted, and discharged outside of the bars of the frame, thus operating upon the soil, pulverizing, separating, evening, and leaving it in the best possible condition for receiving the seed.

This harrow will answer as well for covering in seed as for the purposes before stated.

What I claim as my invention, and desire to secure by Letters Patent, is—

The combination, with the bars A of a harrow-frame, of a series of revolving circular conical or concave forked harrow-teeth, said teeth being arranged oblique to the line of draft and operating unitedly, substantially as and for the purposes set forth.

ORMAN COE.

Witnesses:
G. YORKE ATLEE,
R. W. FENWICK.